United States Patent
Hartwich et al.

(10) Patent No.: US 9,461,937 B2
(45) Date of Patent: Oct. 4, 2016

(54) METHOD AND DEVICE FOR A SERIAL DATA TRANSMISSION WITH ADDITIONALLY INSERTED DATA

(75) Inventors: Florian Hartwich, Reutlingen (DE);
Tobias Lorenz, Stuttgart (DE);
Christian Horst, Dusslingen (DE);
Ralf Machauer, Ludwigsburg (DE);
Frank Voetz, Beilstein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 371 days.

(21) Appl. No.: 13/996,180

(22) PCT Filed: Dec. 15, 2011

(86) PCT No.: PCT/EP2011/072966
§ 371 (c)(1),
(2), (4) Date: Sep. 10, 2013

(87) PCT Pub. No.: WO2012/084696
PCT Pub. Date: Jun. 28, 2012

(65) Prior Publication Data
US 2013/0343383 A1 Dec. 26, 2013

(30) Foreign Application Priority Data
Dec. 21, 2010 (DE) ........................ 10 2010 063 797

(51) Int. Cl.
*H04L 12/40* (2006.01)
*H04L 12/947* (2013.01)
*G06F 13/42* (2006.01)
*H04L 12/28* (2006.01)

(52) U.S. Cl.
CPC ............ *H04L 49/25* (2013.01); *G06F 13/4221* (2013.01); *H04L 12/40* (2013.01); *H04L 12/28* (2013.01)

(58) Field of Classification Search
None
See application file for complete search history.

(56) References Cited

U.S. PATENT DOCUMENTS

2006/0067123 A1  3/2006  Jigour et al.

FOREIGN PATENT DOCUMENTS

| CN | 101681326 A | 3/2010 |
|---|---|---|
| CN | 101685433 A | 3/2010 |
| DE | 101 53 085 | 5/2003 |
| DE | 103 11 395 | 9/2004 |

OTHER PUBLICATIONS

International Search Report for PCT/EP2011/072966, dated Mar. 26, 2012.

(Continued)

*Primary Examiner* — Kodzovi Acolatse
(74) *Attorney, Agent, or Firm* — Norton Rose Fulbright US LLP

(57) ABSTRACT

A method and a device is provided to allow additional data to be transmitted between at least two users of a bus system. The transmitted data frames have a logic structure according to the CAN standard ISO 11898-1, and at least two additional short bits are inserted within a temporal bit length of at least some of the CAN bits such that at least for one of the two possible values of the current CAN bit, the first one of the additional bits inserted into this CAN bit is transmitted using a bus level that is the opposite of this value.

10 Claims, 4 Drawing Sheets

(56) References Cited

OTHER PUBLICATIONS

Ziermann et al., "CAN+: A new backward-compatible Controller Area Network (CAN) protocol with up to 16A higher data rates", Design, Automation & test in Europe Conference, 2009 IEEE, Piscataway, NJ, Apr. 20, 2009, pp. 1088-1093.
Cena G, et al., "Overclocking of controller area networks", Electronics Letters, IEEE Stevenage, GB, vol. 35, No. 22, Oct. 28, 1999, pp. 1923-1925.
Imran Sheikh et al., "Improving information throughput and transmission predictability in controller area networks", Industrial Electronics (ISIE), 2010 IEEE International Symposium on, IEEE, Piscataway, NJ, Jul. 4, 2010, pp. 1736-1741.
"Road Vehicles"—Controller area network (CAN)—part 4: Time-triggered communication: IEEE-SA, Piscataway, NJ, Nov. 18, 2010, pp. 1-40.
Road Vehicles—Controller area network (CAN)—Part 1: Data link layer and physical signaling: Piscataway, NJ, Vol. mes.upamd, Nov. 18, 2010 pp. 1-52.

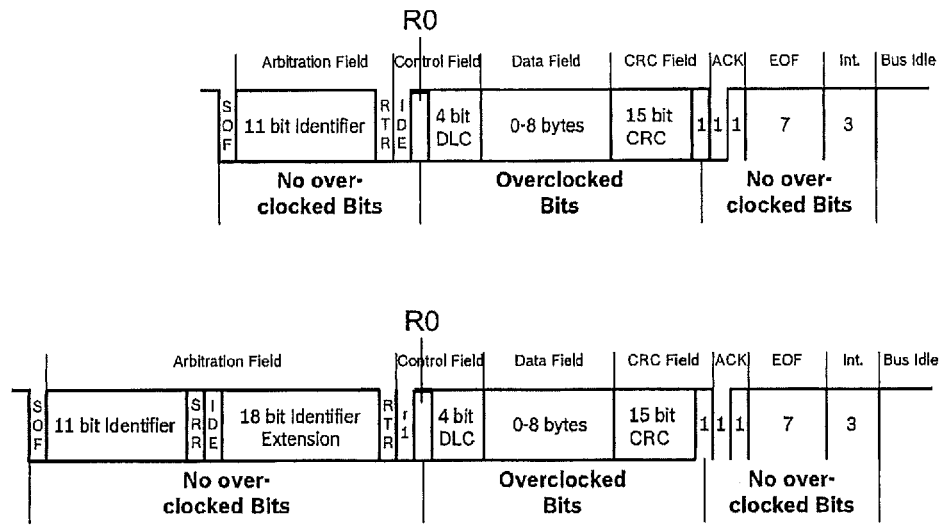
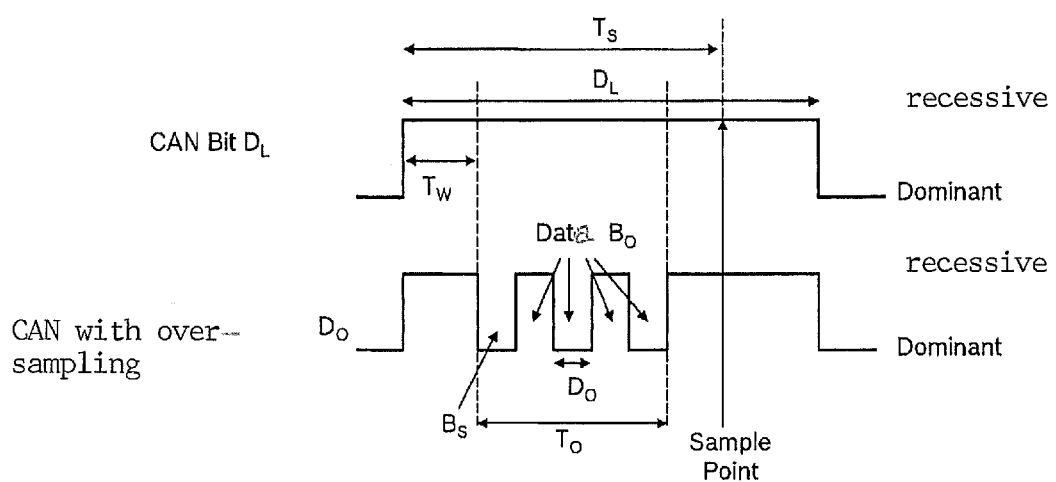
Fig. 1
Fig. 2a

METHOD AND DEVICE FOR A SERIAL DATA TRANSMISSION WITH ADDITIONALLY INSERTED DATA

BACKGROUND OF THE INVENTION

1. Field of the Invention

The present invention relates to a method and a device for transmitting data between at least two users of a bus system, the transmitted data frames having a logic structure according to the ISO 11898-1 CAN standard, and at least two additional short bits being inserted within the temporal bit length of at least some of the CAN bits, such that for at least one of the two possible values of the current CAN bit, the first one of the additional bits inserted into this CAN bit is transmitted using a bus level that is the opposite of this value.

2. Description of the Related Art

For example, from the ISO standard family 11898, the Controller Area Network (CAN) as well as a broadening of the CAN referred to as "Time-Triggered CAN" (TTCAN) is known. The media access control method used in the CAN is based on a bit-wise arbitration. In the bit-wise arbitration, multiple user stations are simultaneously able to transmit data via the channel of the bus system, without interfering with the data transmission in so doing. Furthermore, the user stations are able to ascertain the logical state (0 or 1) of the channel while transmitting a bit over the channel. If a value of the transmitted bit fails to correspond to the ascertained logical state of the channel, the user station terminates the access to the channel. In CAN, the bit-wise arbitration is usually carried out in an arbitration field within a data frame that is to be transmitted via the channel. After a user station has sent the arbitration field to the channel in its entirety, it knows that it has exclusive access to the channel. Consequently, the end of the transmission of the arbitration field corresponds to a beginning of an enable interval, within which the user station is able to use the channel exclusively. According to the protocol specification of the CAN, other user stations may not access the channel, that is, send data to the channel, until the sending user station has transmitted a checksum field (CRC field) of the data frame. Thus, an end point of the transmission of the CRC field corresponds to the end of the enable interval.

The bit-wise arbitration allows a non-destructive transmission of the data frame over the channel. Because of this, excellent real-time properties of the CAN come about, whereas media access control methods, in which the data frame sent by a user station may be destroyed during transmission via the channel because of a collision with a further data frame sent by another station have a clearly more unfavorable real-time behavior since the collision and the thereby required retransmission of the data frame causes a delay in the data transmission.

The protocols of the CAN are particularly suitable for transmitting short messages under real-time conditions. If larger data blocks are to be transmitted via a CAN domain, the relatively low bit rate of the channel becomes a limiting factor. In order to assure the correct functioning of the bit-wise arbitration, it is necessary to observe a minimum duration for the transmission of a bit during the arbitration; this duration is first of all a function of the extension of the bus system, the signal propagation speed on the channel and intrinsic processing times in the interface modules of the bus users, because all bus users must have a uniform image of the state of the bus (0 or 1) and equal priority access to the state of the bus. Therefore, the bit rate cannot readily be increased by reducing the duration of the individual bits.

In order to nevertheless be able to transmit, with sufficient speed, a relatively large data block required for the programming of a control unit via a communication interface that is actually provided for connection to a CAN domain, the published German patent application document DE 101 53 085 A1 proposes a temporary switchover of the communication interface for transmission of the data block to another communication mode, in which no bit-wise arbitration is performed, and a relatively high bit rate is possible as a result. However, the communication with the protocols of the CAN has to be interrupted for a certain period of time in this case. If, for example, the operation of the bus system cannot be resumed again according to the CAN protocols because of an error, there is a failure of the bus system. In addition, the transmission of a relatively large data block will cause a considerable delay in the subsequent transmissions to be undertaken according to the CAN protocols, so that the real-time properties of the CAN are impaired.

Published German patent application document DE 103 11 395 A1 describes a system in which the asynchronous, serial communication is alternatively able to take place via an asymmetrical physical protocol or via the symmetrical physical CAN protocol, and because of this, a higher data transmission rate or data transmission security is achievable for the asynchronous communication.

In the "Proceedings of Design, Automation and Test in Europe (DATE 2009)", IEEE Computer Society, Nice, France, pp. 1088-1093, Apr. 20-24, 2009, Ziermann et al. propose another approach for obtaining a higher data-transmission capacity: Within an enable interval, designated as "S-zone", of the CAN data frame, in which a user station uses the channel exclusively, additional short bits are added to the individual CAN bits within a so-called "gray zone".

It becomes obvious from the cited documents that the related art does not supply satisfactory results from every point of view.

The method proposed by Ziermann et al. envisions a mixed operation with bus users operating according to the CAN standard, and bus users utilizing the newly proposed communication method. The data to be transmitted in addition are split into packets of additional short bits. The packets of additional short bits are inserted into the individual CAN bits in the gray zone in each case, which is set up in such a way that it has ended prior to the scanning instant of the CAN bit. As a result, the bus users operating according to the CAN standard ideally do not notice the insertion of the short bits.

Bus users operating according to the CAN standard resynchronize their internal bit timing with the aid of the signal flanks from recessive to dominant which are applied at the data bus (see ISO 11898-1, ch. 12.4.2). The flanks created by the insertion of the additional bits in the gray zone may lead to interference in this resynchronization process or the synchronicity of the bus users and thus to falsifications or interruptions of the data communication.

Therefore, it is an object of the present invention to describe a method by which data frames with additionally inserted data are able to be transmitted in a CAN network such that the synchronicity of the bus users, which is required for the arbitration, is maintained by suitable measures.

BRIEF SUMMARY OF THE INVENTION

In the present invention, the described object is achieved in that at least two additional short bits are inserted within a temporal bit length of at least some of the CAN bits in predefined or predefinable transmitted data frames that have a logic structure according to the CAN standard ISO 11898-1, and at least for one of the two possible values of the current CAN bit, the first one of the additional bits inserted into this CAN bit is transmitted using a bus level that is the opposite of this value.

It is advantageous, in particular, if the first one of the additional short bits is transmitted as dominant bit, at least if the current CAN bit corresponds to a recessive bus level. The packet of additional short bits thus is supplemented by a leading, dominant bit.

It may furthermore be advantageous if the first one of the additional short bits is always transmitted as recessive bit, if the current CAN bit corresponds to a dominant bus level. In one alternative specific development, however, it may also be advantageous if the first one of the additional short bits is always transmitted as dominant bit, if the current CAN bit corresponds to a dominant bus level. In a third, alternative specific development, the first one of the additional short bits is already used for the data transmission and has no fixed value, if the current CAN bit corresponds to a dominant bus level.

The temporal bit length of the additional short bits advantageously represents no more than one sixth of the temporal bit length of the CAN bits. In an advantageous manner, no additional short bits are inserted in the CAN bits of at least the CAN identifier. In one especially advantageous specific development, additional short bits are inserted only in CAN bits that belong to the data field or to the CRC field.

It is advantageous if the additional short bits inserted into at least some of the CAN bits of predefined or predefinable data frames are used for the transmission of additional data information according to a predefined protocol that deviates from the CAN protocol. In an advantageous manner, the additional short bit inserted using a bus level for at least one of the two possible values (recessive/dominant) of the current bit that is the opposite of this value carries no data information.

In one advantageous specific development, the first one of the additional short bits inserted into the current CAN bit, transmitted using a dominant bus level at least in case of a recessive bus level, is inserted within the CAN bit at a suitable instant and with sufficient bit length, so that it is able to be used for resynchronization of the bit timing by at least the participating data-processing units that operate according to the standard CAN protocol.

It may furthermore be advantageous to develop the method in such a way that additional short bits are inserted only in recessive CAN bits. As an alternative, it may also be advantageous to develop the method in such a way that additional short bits are inserted only in dominant CAN bits.

Moreover, in one advantageous development, the presence of inserted additional short bits in at least some of the CAN bits of a data frame is signaled to at least the receiving data-processing devices by an identification which is transmitted in the same data frame, temporally in advance of the first CAN bit that includes inserted additional short bits.

The insertion of additional short bits for an event-controlled communication including arbitration advantageously takes place only after the arbitration has occurred. Furthermore, it is possible to combine the insertion of additional short bits with the TTCAN protocol, because in TTCAN as well, all data are transmitted in CAN data frames whose basic structure corresponds to the specifications of ISO 11898-1. In this case, the address field and the control field also could be transmitted in full or in part with additionally inserted short bits, at least in the exclusive time windows of the TTCAN matrix in which the bus access is allocated exclusively.

BRIEF DESCRIPTION OF THE DRAWINGS

FIG. 1 schematically shows a data frame including the various areas relevant in the context of the present invention, as well as the identification according to the invention provided in one specific embodiment.

FIG. 2a shows one example of the insertion according to the invention of a packet of additional short bits, having a leading dominant bit, into a recessive CAN bit.

DETAILED DESCRIPTION OF THE INVENTION

In the further text, exemplary embodiments are described for the method and device according to the present invention. These specific examples are used to explain the embodiment, but they do not limit the scope of the inventive thought.

FIG. 1 shows a CAN data frame according to the CAN ISO 11898 standard. The areas start of frame (SOF), arbitration field (AF), control field (CF), data field (DF), CRC field (CRCF), acknowledge field (ACK), and end of frame (EOF) are distinguished.

FIG. 1 shows the two potential variants: standard format and extended format. Areas in which additional bits are insertable according to the invention have been drawn in for both variants. In the scenario shown, these are the areas in which a bus user has exclusive access to the bus, i.e., DLC, data field, CRC, and CRC delimiter. However, it is also possible to select different areas; for instance, the data field may also be utilized exclusively.

Finally, FIG. 1 shows an exemplary embodiment for the identification that is provided in one preferred development of the present invention. The selected position of the identification according to the invention lies in the "reserved bit" $R_O$ in this case, which is transmitted in advance of the DLC. Other possibilities for the identification, for example, are the assignment of fixed address ranges for data frames having inserted short bits.

FIG. 2a shows the insertion of the additional bits into a CAN bit using the example of a recessive CAN bit.

The CAN bit has length $D_L$, e.g., a length of $D_L=2$ microseconds for a transmission rate of 500 kBit/s. A time interval $T_W$ after the start of the CAN bit, the packet of additional short bits is inserted. It has a length of $T_O$. In the example shown, the packet includes five short bits. The first one of the short bits is designated by $B_S$ as synchronization bit and is dominant according to the present invention. It is followed by four overclock data bits $B_O$. Each of these bits has a length $D_O$. In the example shown, this length has a value of $D_O=T_O/5$. The sampling instant (sample point) for the CAN bit lies a time span $T_S$ after the start of the CAN bit. In order to ensure a functioning communication via the standard CAN protocol and, in particular, in order to allow a mixed operation using standard data-processing units, the bus must reliably exhibit the level that corresponds to the particular CAN bit at the sampling point. On the other hand, as shown, the beginning of the packet of additional short bits must lie a sufficient time interval $T_W$ from the preceding flank which possibly signals a change of the CAN bit and is utilized by the participating data-processing units for synchronizing the bit timings. Therefore, the following must apply: $T_W + T_O < T_S$.

Figure 2B:
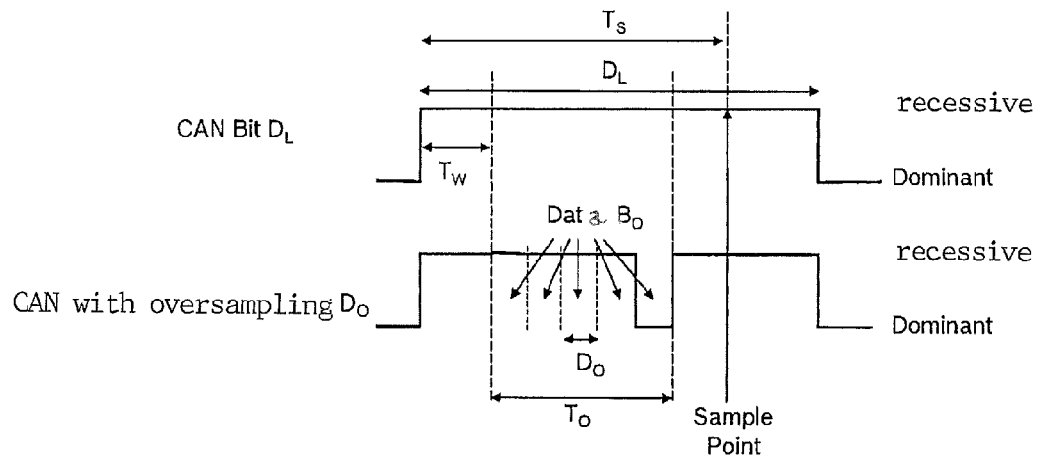
FIG. 2b contrasts this example with a method from the related art (without the leading dominant bit).

In the exemplary embodiment shown in FIG. 2a, the dominant synchronization bit $B_S$ is transmitted following a time interval $T_W$ after the beginning of a recessive bit. According to the synchronization rules of the CAN specification, this recessive-dominant flank leads to the synchronization of the bit timing of the bus users. If, in a deviation from the present invention, the bit would now and again also be transmitted in recessive manner and if, as shown in FIG. 2b for instance, only the last one of the further overclock data bits were dominant, then other bus users could take this late recessive-dominant flank as the beginning of a dominant CAN bit and adapt their bit timing accordingly. In other words, the synchronization could run away. In the least favorable case, CAN bits would be skipped and ostensible errors detected in CAN data frames as a result, with the CAN-inherent consequences (error frames, etc.). In the present invention, this is avoided by the fact that the synchronization bit in recessive CAN bits is invariably transmitted dominantly. This will be discussed in greater detail in connection with FIG. 3.

Figure 2C:
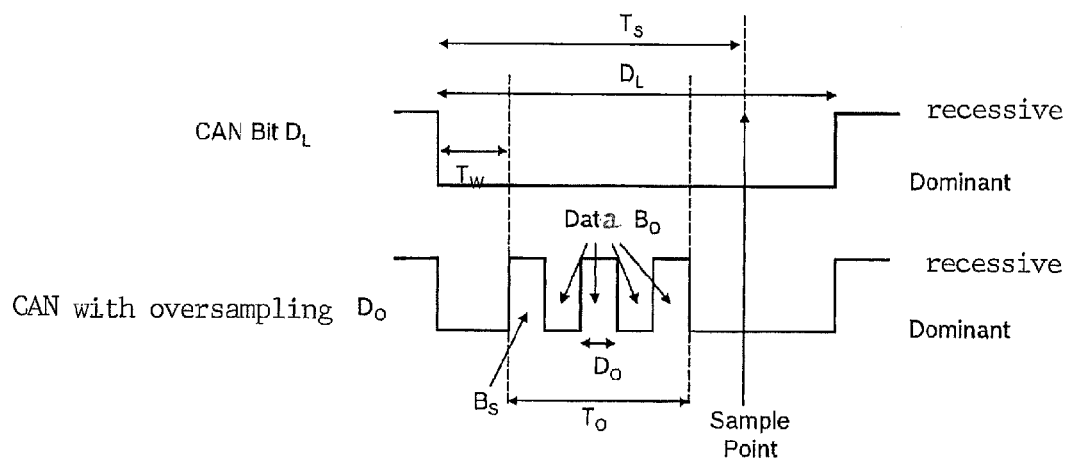
FIGS. 2c through 2e show various potential alternatives for the insertion into dominant CAN bits according to the present invention.
Figure 2D:
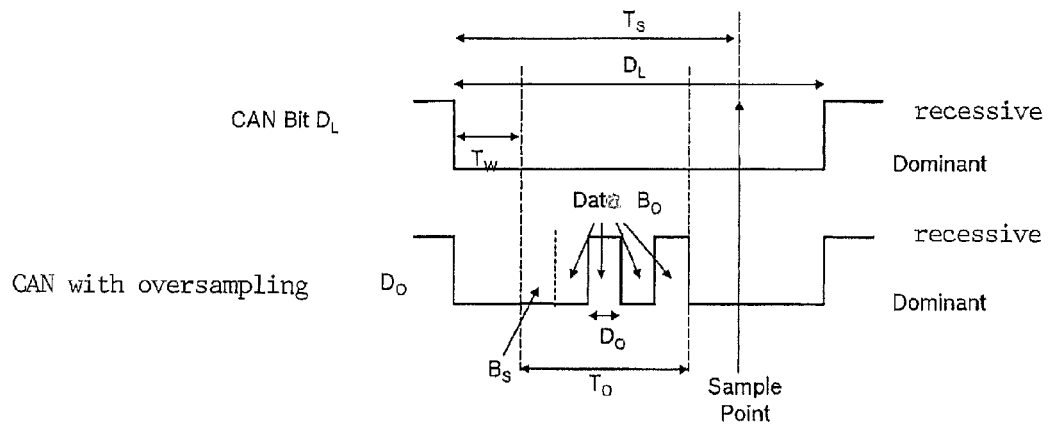
Figure 2E:
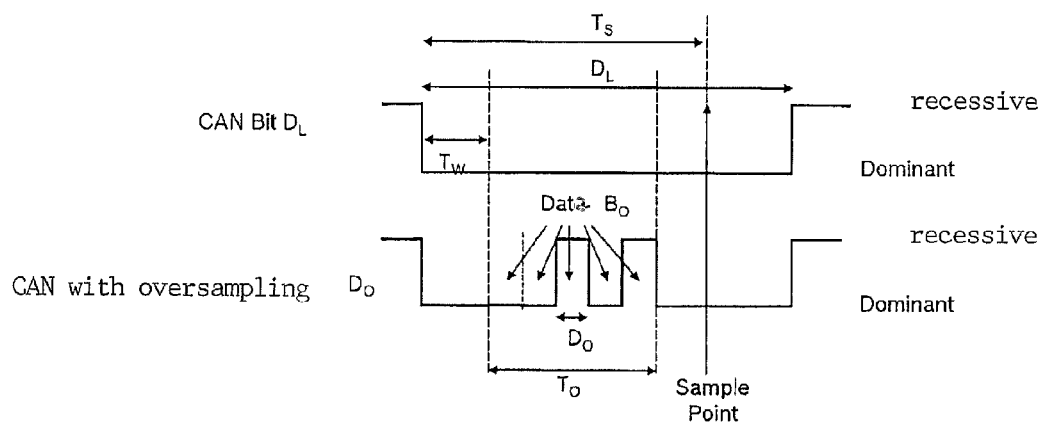

FIGS. 2c through 2e show the various alternatives for the insertion of the additional short bits into dominant CAN bits: FIG. 2c shows a leading recessive synchronization bit. FIG. 2d shows a leading dominant synchronization bit. Finally, FIG. 2e shows a scenario in which the packets of additional short bits without leading synchronization bit are inserted into dominant CAN bits, so that all bits are able to be used as overclock data bits.

It is useful but not necessary if all overclock data bits and the synchronization bit have the same length $D_O$. For example, it may also be useful to transmit the synchronization bit at, for instance, twice the length in comparison with the overclock data bits, in order to ensure that the resynchronization mechanism of the connected bus users, which will be discussed in more detail in connection with FIG. 3, reliably responds to the associated recessive-dominant flank.

As far as the term overclock data bit is concerned, it should be added that the transmitted short bits are composed to form, for example, physical values, image data, control data etc. according to a specific protocol, which is not discussed here in greater detail. Depending on the protocol used, it is naturally also possible to transmit checksums, control bits etc. in addition to the actual useful data. The term overclock data bit describes bits that contribute to the totality of the information to be transmitted according to the protocol. In contrast, the synchronization bit does not contribute anything in this regard since it is always transmitted at a fixed value.

Figure 3:
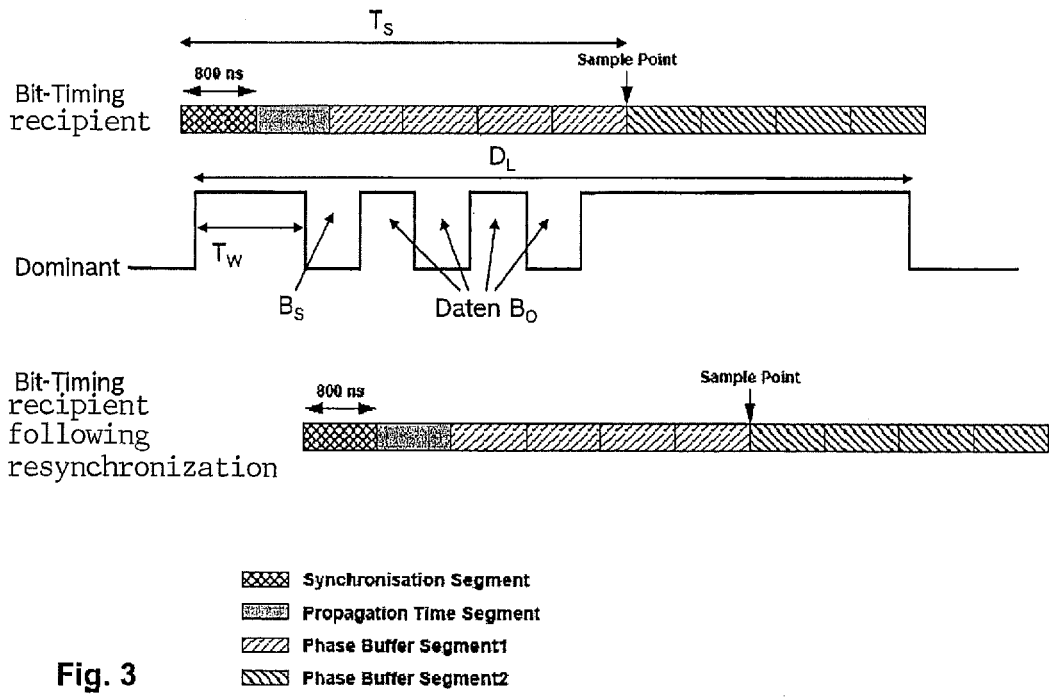
FIG. 3 shows the effect of the recessive-dominant flank of the inserted packet on the bit timing of a connected bus user due to the CAN resynchronization.

FIG. 3 shows the partitioning of each transmitted bit into bit-time segments, whose length is measured in bus time units, and the influence of the additional short bits on the bit timing of a connected bus user. The partitioning into synchronization segment, propagation time segment, as well as phase buffer segment 1 and 2 is usually configured in each bus user and essentially serves to adjust signal propagation times on the bus and tolerances among the clock generators or oscillators employed. In an analogous manner to FIG. 2, five short bits are inserted into the illustrated recessive CAN bit.

The connected bus user in the illustrated example receives the recessive-dominant flank at the beginning of the synchronization bit after the synchronization segment, i.e., in the propagation time segment. As shown, the internal bit time is started anew in response to the reception. (Condition for this according to the CAN specification is that the deviation in bus time units is smaller than the parameter "resynchronization jump width"). The sample point is thereby shifted to the back, but in such a way in the illustrated scenario that the correct value of the (recessive) CAN bit will be sampled. If the leading synchronization bit were missing, on the other hand, the sample point could either make its way behind the end of the CAN bit by the resynchronization, or the adaptation of the bit-timing parameters buffer segment 1 and/or 2 according to the CAN specification could interfere with the bus timing.

The reception of the next recessive-dominant flank of a regular CAN bit would lie in phase buffer segment 2 in the case illustrated. Here, too, the bit time for the following bit would be restarted at the recessive-dominant flank. If time interval $T_W$ is not selected too high, the insertion of the additional short bits thus leads only to a back-and-forth jump of the bit time. In the configuration of the bit time, $T_S$ therefore should be selected in such a way in the configuration of the bit time that, notwithstanding this back-and-forth jumping, the sample point always comes to lie between the last overclocked data bit $B_O$ and the end of the CAN bit.

Length $D_O$ of the inserted bits is subject to marginal conditions; In one possible development, the sample point would typically lie at approx. ¾ of the length of the CAN bit. To ensure, as described in the previous paragraph, that the inserted short bits begin with sufficient clearance $T_W$ to the start of the CAN bit, and end in time before the sample point, length $T_O$ of the inserted packet of short bits must not be more than approximately one third of CAN bit length $D_L$. In order for at least two short bits to find room here, it is useful to select the bit length of short bits $D_O$ no longer than one sixth of CAN bit length $D_L$.

The benefit with regard to the data transmission rate of the method shown in the first exemplary embodiment is illustrated by the following calculation: We assume a length of the data field of 8 bytes, data frames in the standard format featuring 11-bit addressing, as well as a baud rate of 500 kbit/s. It is furthermore assumed that four additional overclock data bits $B_O$ and the leading synchronization bit $B_S$ are transmitted per CAN bit of the data field. Disregarding possible stuff bits, 111 CAN bits (SOF, Identifier, RTR, IDE, r0, DLC, Data, CRC, CRC-Delimiter, ACK-Field, EOF, Intermission) are transmitted per data frame in this example, and additionally, five short bits are transmitted in 84 of these CAN-bits (DLC, Data, CRC, CRC-Delimiter) in each case, four of which are overclock data bits. This results in an effective transmission capacity of 447 bits in 222 microseconds. At the same assumed bus workload, this corresponds to a data transmission rate that is increased by a factor of 4 compared to the unmodified standard CAN transmission. Due to the leading synchronization bits, it is simultaneously possible for the bus users to remain in synchrony and for the arbitration method, which controls the transmit access to the bus, to function without any problems as a result.

It may also be advantageous to insert the short bits according to the present invention into recessive CAN bits exclusively or into dominant CAN bits exclusively.

In the event that the insertion of additional short bits is used in a TTCAN bus system, it is also possible to transmit the address field and the control field completely or partially with additionally inserted short bits, at least in the exclusive time windows of the TTCAN matrix, in which the bus access is exclusively assigned.

Suitable bus connection units (transceivers) which allow a sufficiently rapid adjustment of the bus levels are required in order to link the bus users according to the present invention to the bus system. Driving an additional current at least for the CAN bits in which additional short bits are inserted, using suitable output stages in the transceiver, may be a useful measure toward this end. This allows a more rapid adjustment of at least the recessive level than would be possible in the usual adjustment by the flow of a discharge current across the terminal resistors.

Figure 4:
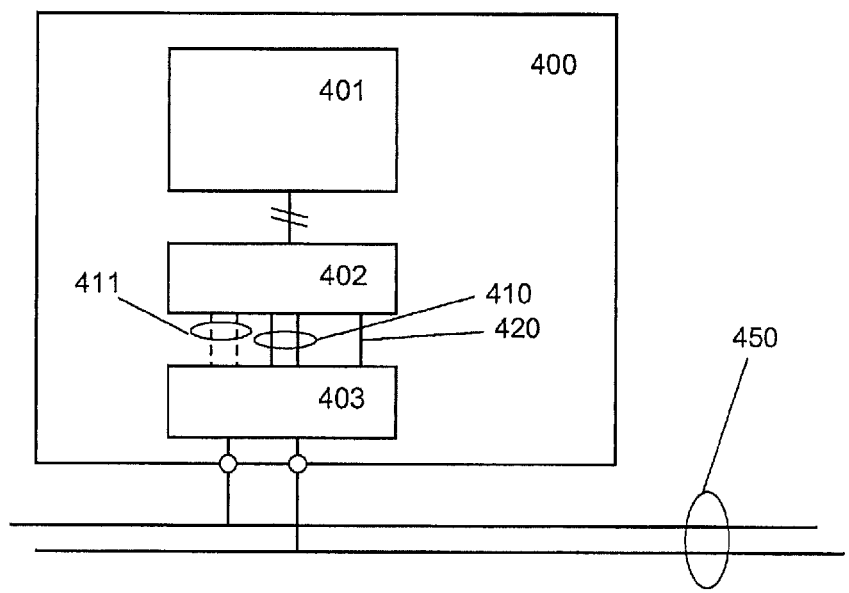
FIG. 4 schematically shows one example of a device according to the present invention, together with the additional control line for the transceiver switchover provided in one specific development.

FIG. 4 schematically illustrates a bus user 400. This user includes a microprocessor 401, a communication controller 402 as a device according to the present invention, as well as a bus connection unit 403, via which the bus user is connected to the two-wire CAN bus system 450 by means of suitable terminals. Communication controller 402 is connected to bus connection unit 403 via an individual transmit and receive line (RxD, Txd) 410, and additional control lines 411, as known from the related art. In addition, device 402 has another output in the illustrated development, by which it is connectable to an input of bus connection unit 403. In one suitable development, bus connection unit 403 is provided with an additional input which allows the behavior of bus connection unit 403 to be switched between standard CAN behavior and a behavior adapted to the method of the present invention. In FIG. 4, the additional output of device 402 is connected to the additional input of bus connection unit 403 by means of connection 420, which enables a switchover of bus connection unit 403 while the additional short bits are transmitted, for instance in order to drive the adjustment of the bus levels by an additional current, as described earlier in the text.

In summary, the described invention provides a solution for the posed objective of transmitting data frames with additionally inserted data in a CAN network such that the synchronicity of the bus users, which is required for the arbitration, is maintained by suitable measures.

What is claimed is:

1. A method for data transmission in a network having at least two participating data processing units, comprising:
   transmitting data frames between the at least two data processing units via the network, wherein the transmitted data frames have a logical structure according to the CAN ISO 118981-1 specification;
   wherein at least two additional short bits are inserted within a temporal bit length of at least some CAN bits of predefined data frames transmitted, and wherein at least in the event that the current CAN bit corresponds to a dominant bus level, the first one of the at least two additional short bits inserted into the current CAN bit is transmitted using a recessive bus level, and wherein the at least two additional short bits are inserted only into CAN bits which correspond to a dominant bus level, wherein the additional short bits inserted into at least some of the CAN bits of predefined data frames are at least partially used for transmission of additional data information according to a protocol which deviates from the CAN protocol, and the first one of the at least two additional short bits inserted into the current CAN bit does not carry any data information.

2. The method as recited in claim 1, wherein a temporal bit length of the additional short bits represents no more than one sixth of the temporal bit length of the CAN bits.

3. The method as recited in claim 1, wherein no additional short bits are inserted into at least CAN bits of a CAN identifier.

4. The method as recited in claim 3, wherein additional short bits are inserted only in CAN bits which belong to a data field or to a CRC field.

5. The method as recited in claim 1, wherein the first one of the additional short bits inserted into the current CAN bit is inserted at a selected instant and with sufficient bit length within the current CAN bit, so that the first one of the additional short bits is able to be used for resynchronization of bit timing, at least by the participating data-processing units which operate according to standard CAN protocol.

6. The method as recited in claim 1, wherein the presence of the inserted additional short bits in at least some CAN bits of a selected data frame is signaled at least to a receiving data-processing unit by an identification which is transmitted in the selected data frame, temporally in advance of the first CAN bit which includes the inserted additional short bits.

7. The method as recited in claim 6, wherein a reserved bit within a control field in the selected data frame is used for the identification.

8. The method as recited in claim 1, wherein, when the bus system is operated in a time-controlled mode according to ISO 11898-4 (TTCAN), additional short bits are inserted also in CAN bits of a CAN identifier or a control field, at least in data frames which are transmitted in exclusive time windows.

9. A device for controlling data transmission in a network having at least two participating data-processing units and a connection for transmission of data frames, the transmitted data frames having a logical structure according to the CAN ISO 11898-1 specification, comprising:
   a processor and a memory, the processor configured to provide an insertion of at least two additional short bits within a temporal bit length of at least some CAN bits of predefined data frames transmitted, wherein the processor is further configured such that, at least in the event that the current CAN bit corresponds to a dominant bus level, the first one of the at least two additional short bits inserted into the current CAN bit is transmitted using a recessive bus level, and wherein the at least two additional short bits are inserted only into CAN bits which correspond to a dominant bus level, wherein the additional short bits inserted into at least some of the CAN bits of predefined data frames are at least partially used for transmission of additional data information according to a protocol which deviates from the CAN protocol, and the first one of the at least two additional short bits inserted into the current CAN bit does not carry any data information.

10. The device as recited in claim 9, further comprising a bus connection unit connected to the processor, wherein a control output is transmitted from the processor to the bus connection unit for adapting the operating behavior of the bus connection unit.

* * * * *